US010693801B2

(12) United States Patent
Tsirkin

(10) Patent No.: US 10,693,801 B2
(45) Date of Patent: Jun. 23, 2020

(54) PACKET DROP REDUCTION IN VIRTUAL MACHINE MIGRATION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/900,396

(22) Filed: Feb. 20, 2018

(65) Prior Publication Data

US 2019/0260685 A1 Aug. 22, 2019

(51) Int. Cl.
H04L 12/863 (2013.01)
H04L 12/879 (2013.01)
H04L 12/26 (2006.01)
H04L 12/24 (2006.01)
G06F 9/455 (2018.01)

(52) U.S. Cl.
CPC ........ H04L 47/627 (2013.01); G06F 9/45558 (2013.01); H04L 41/5009 (2013.01); H04L 43/0882 (2013.01); H04L 47/6255 (2013.01); H04L 49/901 (2013.01); G06F 2009/4557 (2013.01); G06F 2009/45595 (2013.01)

(58) Field of Classification Search
CPC ............ H04L 41/5009; H04L 47/6255; H04L 47/627; H04L 43/0882; H04L 49/901; G06F 9/45558; G06F 2009/4557; G06F 2009/45595
USPC ........................................................ 370/235
See application file for complete search history.

(56) References Cited

U.S. PATENT DOCUMENTS 7,013,482 B1 3/2006 Krumel
7,492,787 B2 2/2009 Ji et al.
7,761,573 B2 7/2010 Travostino et al.
(Continued)

FOREIGN PATENT DOCUMENTS

CN 103299278 A 9/2013
CN 105208048 A1 12/2015
(Continued)

OTHER PUBLICATIONS

Nachum, Youval, et al. "Scaling the Address Resoultion Protocol for Large Data Center (SARP)", http://tools.ietf.org/id/draft-nachum-sarp-04.txt, Feb. 24, 2013, 6 pages.
(Continued)

Primary Examiner — Yemane Mesfin
Assistant Examiner — Intekhaab A Siddiquee
(74) Attorney, Agent, or Firm — Lowenstein Sandler LLP

(57) ABSTRACT

Implementations of the disclosure provide for queuing portions of the network traffic directed to a migrated guest for both receiving and transmitting at a source of the migration. In one implementation, a method is provided. The method comprises receiving, by a processing device via a network interface card (NIC), a first data packet. The first data packet includes a network address associated with a virtual machine (VM) that migrates from a first host to a second host. The first data packet is queued in a memory buffer at the first host in view of the network address. An indication that the network address of the VM is associated with the second host is received. Thereupon, the method causes the NIC to transmit the first data packet from the memory buffer over a network associated with the VM at the second host.

20 Claims, 5 Drawing Sheets

(56) References Cited

U.S. PATENT DOCUMENTS

| | | | |
|---|---|---|---|
| 8,396,986 | B2 | 3/2013 | Kanada et al. |
| 8,413,147 | B2 | 4/2013 | Shen et al. |
| 8,429,647 | B2 | 4/2013 | Zhou et al. |
| 8,539,045 | B2 | 9/2013 | Kang et al. |
| 8,819,678 | B2 | 8/2014 | Tsirkin |
| 8,850,430 | B2 | 9/2014 | Hayward et al. |
| 8,924,560 | B2 | 12/2014 | Pang et al. |
| 8,966,495 | B2 | 2/2015 | Kulkarni |
| 9,008,084 | B2 | 4/2015 | Zhang et al. |
| 9,081,603 | B2 | 7/2015 | Zhang et al. |
| 9,104,460 | B2 | 8/2015 | Jansen |
| 9,160,668 | B2 | 10/2015 | Tripathi et al. |
| 9,229,755 | B2 | 1/2016 | Dow et al. |
| 9,336,042 | B1 | 5/2016 | Brenneman et al. |
| 9,350,614 | B2 | 5/2016 | Zeng et al. |
| 9,396,022 | B2 | 7/2016 | Miyazaki |
| 9,424,144 | B2 | 8/2016 | Sridharan et al. |
| 9,565,126 | B2 | 2/2017 | Narayanasamy et al. |
| 9,628,290 | B2 | 4/2017 | Banavalikar et al. |
| 9,836,327 | B1 | 12/2017 | Brouwer et al. |
| 2008/0222375 | A1 | 9/2008 | Kotsovinos et al. |
| 2009/0183173 | A1 | 7/2009 | Becker et al. |
| 2011/0134931 | A1 | 6/2011 | Merwe et al. |
| 2013/0232492 | A1 | 9/2013 | Wang |
| 2013/0238802 | A1 | 9/2013 | Sarikaya |
| 2013/0262647 | A1 | 10/2013 | Kurita et al. |
| 2013/0275592 | A1 | 10/2013 | Xu et al. |
| 2013/0305242 | A1 | 11/2013 | Wang et al. |
| 2014/0007089 | A1 | 1/2014 | Bosch et al. |
| 2014/0025821 | A1 | 1/2014 | Baphna et al. |
| 2014/0289399 | A1 | 9/2014 | Shimokuni et al. |
| 2014/0297889 | A1 | 10/2014 | Dong et al. |
| 2014/0298335 | A1 | 10/2014 | Regev et al. |
| 2015/0029856 | A1 | 1/2015 | Rozenberg |
| 2015/0117256 | A1 | 4/2015 | Sabaa et al. |
| 2015/0222515 | A1 | 8/2015 | Mimura et al. |
| 2015/0309818 | A1 | 10/2015 | Lee et al. |
| 2015/0370596 | A1 | 12/2015 | Fahs et al. |
| 2015/0378759 | A1 | 12/2015 | Pershin et al. |
| 2016/0004548 | A1 | 1/2016 | Suzuki et al. |
| 2016/0070601 | A1 | 3/2016 | Yamamoto et al. |
| 2016/0077935 | A1 | 3/2016 | Zheng et al. |
| 2016/0103699 | A1 | 4/2016 | Thakkar et al. |
| 2016/0117185 | A1 | 4/2016 | Fang et al. |
| 2016/0246632 | A1 | 8/2016 | Tsirkin |
| 2016/0323245 | A1 | 11/2016 | Shieh et al. |
| 2016/0378530 | A1* | 12/2016 | Ramasubramanian ............... G06F 9/45558 718/1 |
| 2017/0005923 | A1 | 1/2017 | Babakian |
| 2017/0019328 | A1 | 1/2017 | Moreno et al. |
| 2017/0264496 | A1 | 9/2017 | Ao et al. |
| 2017/0359414 | A1 | 12/2017 | Sengupta et al. |
| 2018/0091591 | A1 | 3/2018 | Puri et al. |

FOREIGN PATENT DOCUMENTS

| | | | |
|---|---|---|---|
| EP | 2698957 | B1 | 7/2016 |
| WO | 2012051884 | A1 | 4/2012 |
| WO | 2012119390 | A1 | 9/2012 |
| WO | WO-2017210641 | A1 * | 12/2017 ......... G06F 9/45558 |

OTHER PUBLICATIONS

Nobel, Rickard, "The vSwitch Notify Switches Setting", Rickard Nobel Vmware, Window, Storage and Networking, http://rickardnobel.se/vswitch-notifiy-switches-setting/ Jul. 14, 2012, 15 pages.

Gigamon, "Network Monitoring for Virtual Server Environments", Solution Brief, https://www.gigamon.com/sites/default/files/resources/solutions/sb-network-monitoring-for-virtual-server-environments-3115.pdf, 2014.

Vae, Karim, "Azure: How to Prepare for Maintenance Impacting your Virtual Machines", The insights of a Quirky Cloud Solution Architect on his Journey Through the Fast Paced It Landscape, http://kvaes.wordpress.com/2017/02/13/azure-how-to-prepare-for-maintenance-impacting-your-virtual-machines/, Feb. 13, 2017.

Microsoft Corporation, "Simplify Virtual Machine Management and Migration with Ethernet Fabrics in the Datacenter", http://www.brocade.com/content/dam/common/documents/content-types/whitepaper/brocade-ms-ethernet-fabric-solution-blueprint.pdf, Mar. 2011.

Li et al., "HyperMIP: Hypervisor Controlled Mobile IP for Virtual Machine Live Migration Across Networks", School of Computer Science and Engineering, Beihang University, Beijing, China, accessed, Jun. 28, 2017, 9 pages, https://pdfs.semanticscholar.gor/661e/4e7dcde6197740184466a16dat7397238184.pdf.

"A Virtual Machine Loses Network Connectivity after vMotion (1007464)", VMWare Knowledge Base, Nov. 29, 2016, 2 pages, https://kb.vmware.com/selfservice/microsites/search.do?language=en_US&cmd=displayKC&extemalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages, http://www.cs.princeton.edu/courses/archive/fall10/cos561/papers/VROOM08.pdf.

Cully et al., "Remus: High Availability via Asynchronous Virtual Machine Replication", Department of Computer Science the University of British Columbia, accessed Jun. 27, 2017, 21 pages, http://www.usenix.org/legacy/event/hsdi08/tech/full_papers/cully/cully_html/.

Vmware, "More a Virtual Machine to a New Locationor Host", Jul. 28, 2017, 1 page.

Stuart, Morgan, "Mitigating Interference during Virtual Machine Live Migration through Storage Offloading", retrived from http://scholarscompass.vcu.edu/cgi/viewcontent.cgi?referer=https://www.google.co.in/&httpsredir=1&article=5724&context=etd, Virginia Commonwealth University, Richmond, Virginia, USA, Dec. 2016, 71 pages.

Shen, Z, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, in SoCC. ACM, Oct. 5-7, 2016, 14 pages.

Stuart, "Mitigating Interference during Virtual Machine Live Migration through Storage Offloading" 2016, 71 pages https://scholarscompass.vcu.edu/cgi/viewcontent.cgi?referer=https://www.google.co.in/&httpsredir=1&article=5724&context=etd.

Shen et al., "Follow the Sun through the Clouds: Application Migration for Geographically Shifting Workloads", Oct. 5-7, 2016, 14 pages https://pdfs.semanticscholar.org/e76e/6d0753a4136337f1d10d94257825bd7a1cfd.pdf.

Silvera et al "IP Mobility to Support Live Migration of Virtrual Machines Across Subnets", SYSTRO May 4-6, 2009, 10 pages.

Kalim et al., "Seamless Migration of Virtual Machines Across Networks", IEEE, 2013, 7 pages.

Bifulco, et al., "Transparent Migration of Virtual Infrastructures in Large Datacenters for Cloud Computing", IEEE, 2011, pp. 179-184.

Stuart, "Mitigating Interference during Virtual Machine Live Migration through Storage Offloading" 2016, 71 pages https://scholarscompass.vcu.edu/cgi/viewcontent.cgi?referer=https://www.google.co.in/&httpsredir=1&article=5724&,context=etd.

Shen et al., "Follow the Sun through the Clouds: Application Migration for Geographically Shifting Workloads", Oct. 5-7, 2016, 14 pages https://pdfs.sernanticscholar.org/e76e/6d0753a4136337f1d10d94257825bd7a1cfd.pdf.

* cited by examiner

PACKET DROP REDUCTION IN VIRTUAL MACHINE MIGRATION

TECHNICAL FIELD

The implementations of the disclosure relate generally to network port forwarding and, more specifically, relate to packet drop reduction in virtual machine migration.

BACKGROUND

A virtual machine system sometimes includes multiple physical machines and runs multiple hypervisors on a single machine. Each hypervisor can support multiple virtual machines, with each virtual machine running guest applications to perform tasks for a user. From time to time a system administrator may want to move ("migrate") a virtual machine from one hypervisor to another for maintenance or performance reasons.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

Figure 1:
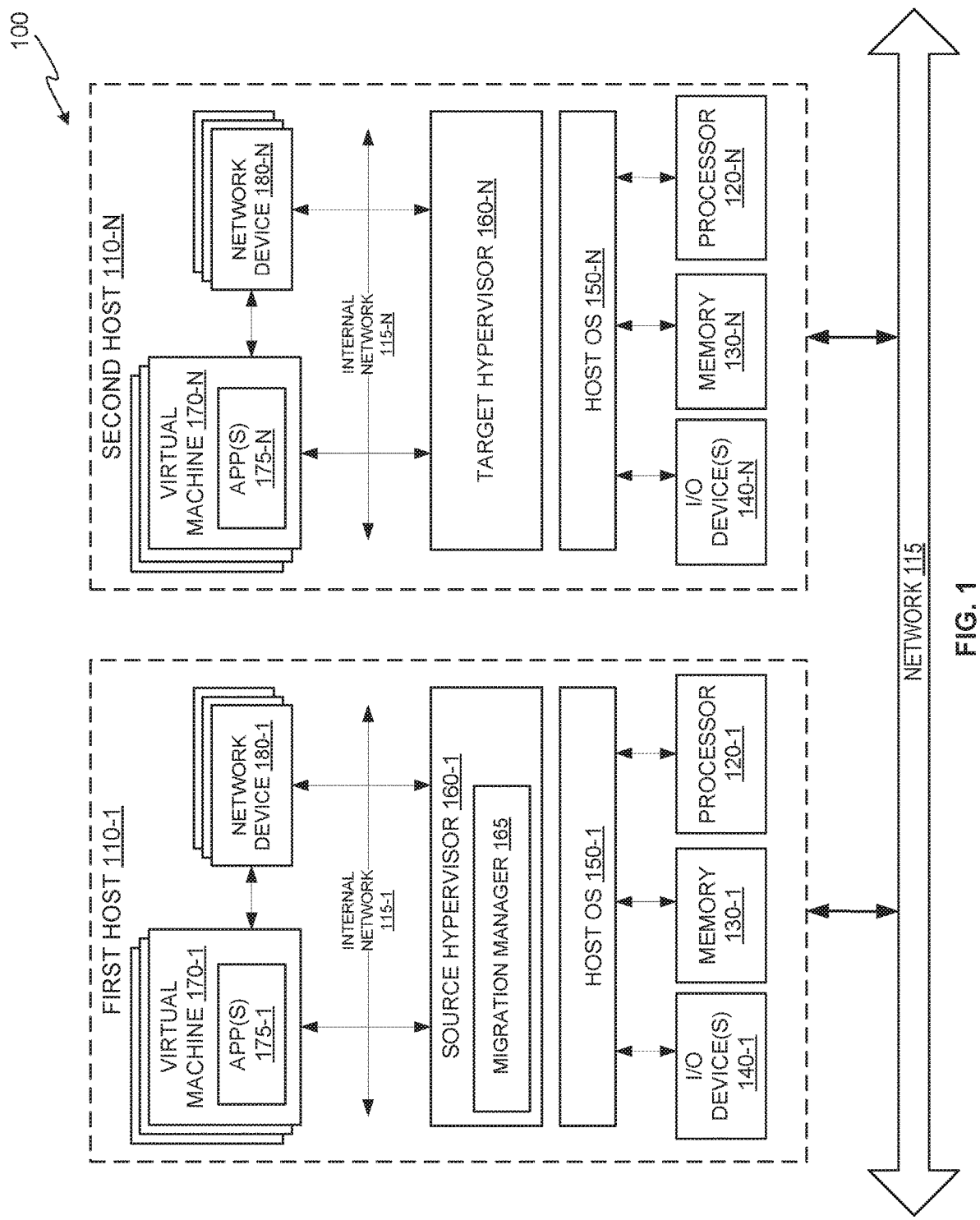
FIG. 1 is a block diagram of a computer system directed to packet drop reduction in virtual machine migration according to an implementation of the disclosure.

Embodiments of the disclosure provide for packet drop reduction in virtual machine migration. A host system implementing a virtual machine (also referred to as "a guest") may include multiple physical machines that may run multiple hypervisors on a single machine. Each hypervisor can support multiple guests, with each guest running a plurality of applications to perform tasks for a user. From time to time a system administrator may want to move ("migrate") a guest from one source hypervisor to a different hypervisor for maintenance or performance related issues. The migration of the guest may be a "live migration" in which the guest is to be moved without disconnecting a client of the guest or the applications executing therein.

When the guest migrates to a different hypervisor (also referred to as "a target hypervisor"), its physical network location is changed. A changed network location means that the target hypervisor is now responsible for forwarding packets to the guest. After the guest is migrated, the target hypervisor may broadcast a notification packet that includes an address (e.g., media access control (MAC) address) associated with the guest in order to reprogram the network. For example, a network interface controller (NIC) (also referred to as "a network device") in the network to which the target hypervisor is coupled may receive the notification of the guest's new association with the target hypervisor so that the guest can continue to receive network data packets after the migration. This received notification on the NIC implies that the portion of the network connected to the NIC has been updated. For example, for Ethernet routers, the act of forwarding the notification causes the routers to update the forwarding tables. Therefore, receiving a packet from destination (e.g., target hypervisor) implies that there exists a path in the network connected to a NIC which has been updated with the new location of the guest.

There are, however, several issues that can occur due to the reprogramming of the network as a result of the guest migration. For example, some host systems may provide clients with a service level agreement that ensures hosted applications can achieve zero packet loss. This may be achieved with a combination of partitioning network resources, reductant network links and service settings for the host systems to handle recovery from reordered of duplicate packets (which may be caused by the redundancy). When a guest migrates from a source hypervisor to a target hypervisor, it may take some time for the notification packets to be delivered to all of the network devices of the network. As a result, some packets for the migrated guest may end up at the source hypervisor and not the target hypervisor. Although the source hypervisor may re-transmit the packets, this does not happen immediately which is a source of network latency. For guests with only a networking interface, this results in the migration not being "live." Furthermore, the date packets arriving at the wrong host can cause the network link to overload and/or socket buffers to overrun, which can significantly degrade the system's ability to achieve zero packet loss.

Implementations of the disclosure address the above-mentioned and other deficiencies by keeping portions of the network traffic for the migrated guest reserved for both receiving and transmitting at the source (e.g., source hypervisor) of the migration. An advantage of the disclosure is that no encapsulation or translation of packets is required to forward the data packets to a new location of the migrated guest. For example, the queuing of data packets may continue until the network has learned of the new location of the guest on the target hypervisor. After a guest is migrated from a source hypervisor to a target hypervisor, the source hypervisor may examine information regarding incoming data packets directed to the migrated guest. If data packet is received by the source hypervisor, but the packet specifies the migrated guest as a destination address, this may indicate that the network has not yet learned of the new location of the guest on the target hypervisor. Based on this information, the source hypervisor may queue the data packets until the new information for the guest is available on the network.

The incoming data packets that are directed to the migrated guest can be queued at the source hypervisor in several ways. In some implementations, the incoming data packets are queued in a data structure in memory allocated the guest by the source hypervisor. In other implementations, the source hypervisor may maintain a data structure to queue certain data packets for all of the VMs managed by the hypervisor. In such a case, the data structure may include an identifier to distinguish which queued data packets are associated with which of the guests.

In some implementations, the data structure may be a first-in-first-out (FIFO) buffer (although other type of data structures may be implemented). In this regard, the incoming data packets directed to the migrated guest are queued in the order in which they are received at the source hypervisor. Memory space allocated the data structure to queue the data packets may be provisioned when partitioning source hypervisor memory to allocate for the guest. In some implementations, the amount of space allocated to queue data packets at the data structure may be proportional to a network bandwidth threshold that may be calculated based on, e.g., network latency*maximum throughout. In one implementation, the amount of data packets queued may be adjusted when the network bandwidth associated with the network does not satisfy the network bandwidth threshold level. This may allow the data structure to queue an increasing number of the packets, for example, if it takes an extended amount of time for the network to learn the new location of the guest.

In some implementations, the source hypervisor may receive a packet indicating that the network has learned the new location of the guest on the target hypervisor. For example, the source hypervisor may receive a particular data packet specifying the migrated guest's address as the source address. This data packet indicates the guest is now associated with the target hypervisor because the guest is currently transmitting data from this new location. This packet may also indicate that all the network switches on path from source to target hypervisor have learned the new location of the guest. At this point, the source hypervisor takes all of the packets in data structure and transmits them back on the network device (e.g., NIC) on which the indication was received. The network device (now knowing the new location of the guest) provides the queued data packets to a network device associated with the target hypervisor for forwarding to guest thereon. After transmission is complete, the source hypervisor is notified to free up the reserved portion of networking bandwidth that is used for the network traffic of the migrated guest as well as the memory used by the data structure to queue the data packets on the source hypervisor.

In some implementations, the source hypervisor buffers the data packets at a memory data structure without making any modification to the packets to account for the change in the location of the guest. As such, the data packets are queued in the data structure at the source hypervisor. When the source hypervisor receives an indication on a network device (e.g., NIC) that the guest is running at the target hypervisor, the queued data packets from the memory data structure are immediately passed to that network device to transmit to the network. The network then forwards the data packets to the new location of the guest at the target hypervisor. Thus, an advantage of the disclosure is that the transmission operation of the packets can be performed with minimum overhead or performance impact on the system because the system hardware may accelerate transmission by not changing the packets to reference the new location of the guest.

FIG. 1 is a block diagram of a computer system 100 in which implementations of the disclosure may operate. "Computer system" herein shall refer to a system comprising one or more computing devices, one or more memory devices, and one or more communication interfaces that are accessible, for example, via a network 115. The computer system 100 hosts a plurality of guest, such as virtual machines (VM) 170-1 through N. Each virtual machine 130 runs one or more guest applications (e.g., applications 175-1 through N) that may use a guest operating system (not shown) to manage its resources. The virtual machines 170-1 through N may run the same or different guest operating systems, such as Linux® operating system. The computer system 100 may be a server, a workstation, a personal computer (PC), a mobile phone, a palm-sized computing device, a personal digital assistant (PDA), etc.

In some implementations, system 100 may include one or more host machine, such as first host 110-1 and second host 110-N. Similar to the computer system 100, each of the hosts 110-1 and 110-N may be a server, a workstation, a personal computer (PC), a mobile phone, a palm-sized computing device, a personal digital assistant (PDA), etc. Each of the host 110-1 and 110-N runs a host operating system (OS), such as host OS 150-1 and host OS 150-N to manage system resources. In one embodiment, the hosts 110-1 and 110-N may run the same kind or different host operating systems. Each of the virtual machines 170-1 and 170-N on the respective host 110-1 and 110-N may also run the same or different guest operating systems. In alternative embodiments, in the event that the computer system 100 does not include host machines 110-1 and 110-N, the virtual machines 170-1 and 170-N may runs on other components of system 100.

Each host machines 110-1 and 110-N of computer system 100 also includes hardware components such as one or more processors 120-1 and 120-N, memory 130-1 and 130-N, input/output (I/O) devices 140-1 and 140-N and other hardware components. "Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, the processors 120-1 and 120-N may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory" 130-1 and 130-N herein refers to a volatile or non-volatile memory device, such as RAM, ROM, EEPROM, or any other device capable of storing data. "I/O device" 140-1 and 104-N herein refers to a device capable of providing an interface between a processor and an external device capable of inputting and/or outputting binary data. Although, for simplicity, a single processor is depicted in each host 110-1 and 110-N in FIG. 1, in some other embodiments the computing devices of computer system 100 may comprise a plurality of processors. Similarly, in some other embodiments the computing devices of computer system 100 may comprise a plurality of I/O devices, rather than a single I/O device.

In some implementations, the host machines 110-1 and 110-N execute a host OS 150-1 and 150-N to manage system resources. In one implementation, each host may also execute multiple hypervisors 160-1, 160-N (although only two are shown in FIG. 1) to virtualize access to the underlying host hardware that makes the use those resources by the virtual machines transparent to the applications 175-1 through N of the users of the computer system 100. In one embodiment, the hypervisors 125 and 135 may be hypervisors in the user space sharing a single hypervisor kernel (not shown). Each of the hypervisors 125 and 135 may support multiple virtual machines 130.

Each host machines 110-1 and 110-N of computer system 100 may execute "host" software, such host operating systems 150-1 and 150-N to manage the hardware and other types of system resources that may include processors 120-1 and 120-N, memory 130-1 and 130-N, I/O device 140-1 and 140-N to provide functions such as inter-process communication, scheduling, memory and data management, and so forth. In some implementations, the host operating systems 150-1 and 150-N may include a virtualization manager, such as hypervisors 160-1 and 160-N. In alternative implementations, the hypervisors 160-1 and 160-N may be a "bare metal" hypervisor that runs on hardware of computer system 100 without an intervening operating system. The hypervisor 150 may abstract the physical layer of the computer system 100, including processors 120-1 and 120-N, memory 130-1 and 130-N, and I/O devices 140-1 and 140-N, and present this abstraction to a client application container, such as a virtual machines 170-1 through 170-N.

The VMs 170-1 through 170-N of computer system 100, in implementations, are accessible by remote systems via an external network 115. The external network 115 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some embodiments, the computer system 100 may additionally include an optional internal network 115-1 and 115-N for facilitating the communication among the virtual machines 170-1 and 170-N on each respective host machine 110-1 and 110-N. In one implementation, the network addresses on the external network 115 and/or the internal networks 115-1 and 115-N contain physical network addresses, such as Media Access Control (MAC) addresses. Although the MAC address is used throughout the description to represent the physical network address, it is understood that other physical network addresses may be used for different network protocols.

In one implementation, VMs 170-1 through 170-N of system 100 receive network data packets from the network 115 via one or more network devices 180-1 and 180-N coupled to the hosts 110-1 and 110-N, respectively. In FIG. 1, the network devices 180-1 and 180-N are shown to be internal to the hosts 110-1 and 110-N, respectively. In alternative embodiments, the network devices 180-1 and 180-N may be external to the hosts 110-1 and 110-N. The network devices 180-1 and 180-N may include a switch, a bridge, a network interface card (NIC), a router, and any network component that tracks the transmission of packets on the networks 115, as well as networks 115-1 and 115-N, respectively. Each of the network devices 180-1 and 180-N may be a hardware device, an emulated device in the source hypervisor 160-1 and target hypervisor 160-N, respectively, a software device, or a combination of the above.

The VMs 170-1 through 170-N, in implementations, may migrate from one hypervisor (e.g., source hypervisor 160-1) to another hypervisor (e.g., target hypervisor 160-N) during operation of the computer system 100. The migration may be a "live migration," which means that the VM can be moved without disruption to the users of the VMs 170-1 through 170-N. In one embodiment, the migration changes the association between the VM and the hypervisors 160-1 and 160-N, but does not change the physical network addresses (e.g., MAC address) of the VM.

After the VM is migrated, the target hypervisor 160-N may broadcast a notification packet that includes an address (e.g., media access control (MAC) address) associated with the VM in order to reprogram the network 115 associated with system 100. For example, the target hypervisor 160-N forwards the address to all network devices 180-1 and 180-N that are in one or more of the networks 115-1 and 115-N of system 100. Thereby, notifying the network devices 180-1 and 180-N of the new location of the migrated VM.

To facilitate operations of system 100 to support zero packet loss due to the migration of the VM from the source hypervisor 160-1 to the target hypervisor 160-N, system 100 may implement a migration manager 165. The migration manager 165 may be implemented in various hardware (circuitry, dedicated logic, etc.), and/or software components of system 100 or some combinations thereof. In some implementations, migration manager 165 may queue portions of the network traffic directed to a migrated VM for both receiving and transmitting at the source of the migration.

Queuing of the network traffic directed to the migrated VM may continue until the network 115 determines that a new location of the VM is ready, for example, at the target hypervisor 160-N. For example, the source hypervisor 160-1 receives an indication that the network address of the migrated VM is associated with a network device 180-N on the target hypervisor 160-N. For example, the indication may include receiving a data packet at the source hypervisor 160-1 that specifies the network address of the migrated VM as a source address. Thereupon, the source hypervisor 160-1 takes all of the packet information from the buffer and transmits it to the network device that received the indication. The network device (which has now learned of the VM's new destination through notification packet) then forwards the packets to a network associated with the VM on the target hypervisor 160-N. The functionally of the migration manager 165 can exist in a fewer or greater number of modules than what is shown, with such modules residing at one or more components of computer system 100, which may be geographically dispersed.

Figure 2:
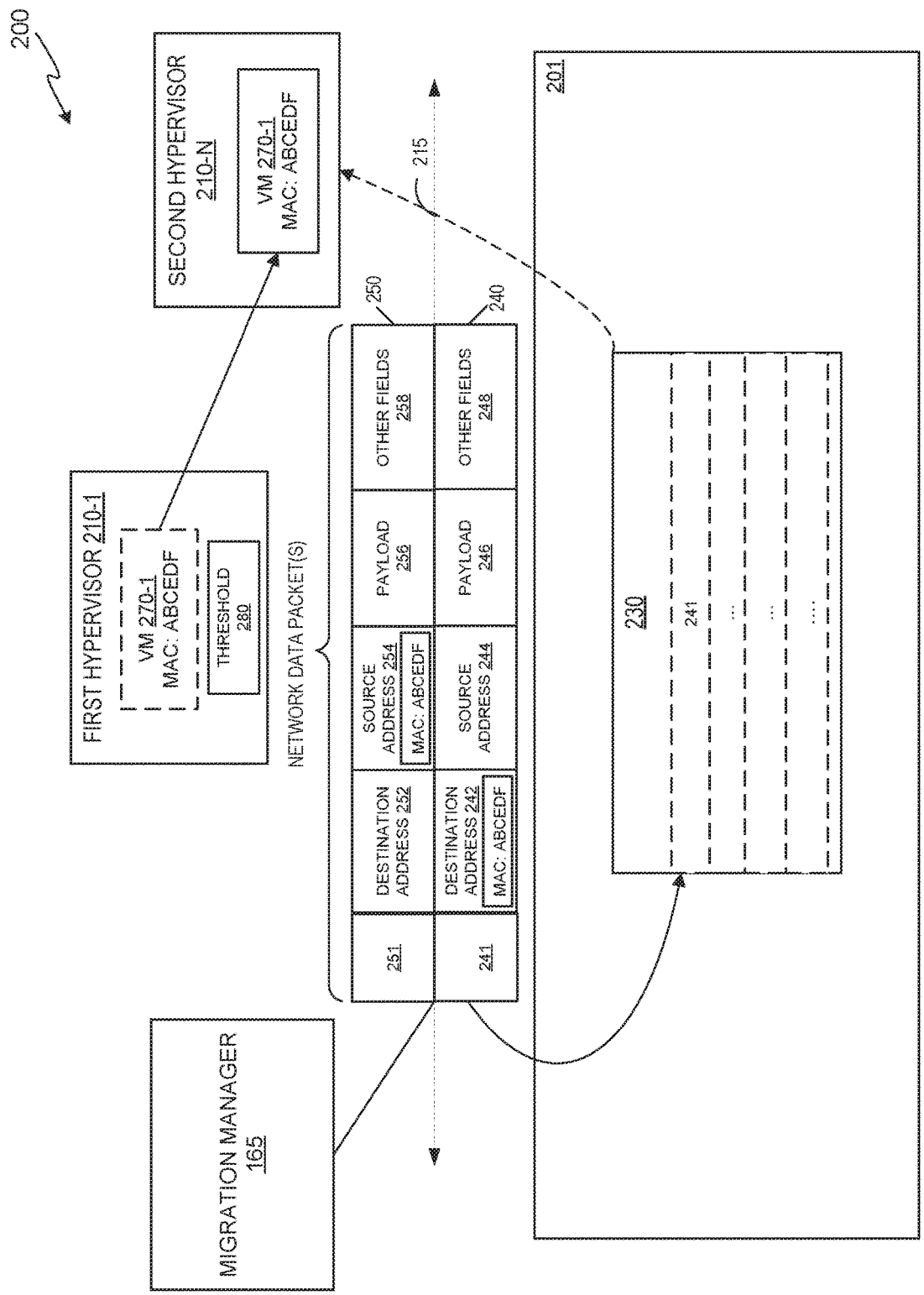
FIG. 2 is a block diagram of a system including a data structure to support packet drop reduction in virtual machine migration according to an implementation of the disclosure.

FIG. 2 is a block diagram of a system 200 including a data structure 230 according to an implementation of the disclosure. The system 200 may be employed to support packet drop reduction in virtual machine migration according to an implementation of the disclosure. The system 200 may be the same as the system 100 of FIG. 1. For example, system 200 includes the migration manager 165 of FIG. 1. The data structure 230 may be stored in memory 201 of system 200. For example, the memory 201 may include any non-persistent data storage (e.g., memory), persistent and/or volatile data storage (e.g., flash storage, hard drive, tape), other medium, or combination thereof that is capable of storing data. In some implementations, the memory 201 may be same as memory 130-1 of host machine 110-1 or 130-N of host machine 110-N of FIG. 1. The system 200 may include a network 215 in which data may be sent and received. In some implementations, the network 215 may be the same as network 115 of FIG. 1.

System 200, in implementations, may support one or more virtual machines, such as virtual machine 270-1. The virtual machine may be the same as one of the VMs 170-1 through N of FIG. 1. The system may implement execute multiple hypervisors, such hypervisors 210-1 and 210-N to support the virtual machines. In some implementations, the first hypervisor 210-1 may be the same as the source hypervisor 160-1 and the second hypervisor 210-N may be the same as the target hypervisor 160-N of FIG. 1. The hypervisors 210-1 and 210-N virtualize access to underlying host hardware of system 200 that makes the use those resources by the virtual machines transparent to the applications of the users of the system 200.

In some implementations, system 200 may migrate the VM 270-1 from the first hypervisor 210-1 to the second hypervisor 210-N. The migration may be a live migration, which means that the VM 270-1 can be moved without disruption to the users of the applications executing therein. In one embodiment, the migration changes the association between the VM 270-1 and the first hypervisor 210-1, but does not change the network addresses (e.g., MAC address) of the VM 270-1 on the second hypervisor 210-N. After the VM 270-1 is migrated, the second hypervisor 210-N may broadcast a notification packet that includes the MAC address associated with the VM 270-1 in order to reprogram the network 215 associated with system 200. For example, the second hypervisor 210-N forwards the address to all of the network devices of network 215 to inform the network 215 of the new location of the migrated VM 270-1.

In some implementations, the system 200 may receive network traffic via network 215 that is directed to the VM 270-1 that migrated from the first hypervisor 210-1 to the second hypervisor 210-N. For example, the network traffic may include a plurality of data packets, such as data packets 240 and 250. In some embodiments, the data packets 240 and 250 include a number of fields that include, but not limited to, a packet identifier fields 241 and 251, a destination address 242 and 252, a source address 244, a payload 246 and 256 that comprise the data to be transmitted as well as other information fields 248 and 258, such as a packet type. These data packets 240 and 250 may be formatted according to certain network protocols.

If VM 270-1 has already been migrated from the first hypervisor 210-1 to the second hypervisor 210-N, incoming packets that are directed to the migrated VM 270-1 can be queued at the first hypervisor 210-1. This may continue until the network 215 learns the new location of the migrated VM 270-1. In some implementations, the migration manager 165 may queue the data packets at a data structure 230 in memory 201. In one implementation, the data structure 230 may be a first-in-first-out (FIFO) buffer. In that regard, the migration manager 165 may queue the incoming data packets directed to the migrated guest in the FIFO buffer 230 in the order in which they are received at the first hypervisor 210-1. In other implementations, other types of data structures may be used.

The data structure 230 may be of a sufficient size to buffer a number of data packets that are directed to the migrated VM 270-1. The memory space for the data structure 230 may be provisioned when partitioning source hypervisor memory to allocate to the VM 270-1. In some implementations, the amount of space of allocated to the data structure may be adjusted based on a network bandwidth threshold 280 that can be calculated based on, e.g., network latency*maximum throughput of the network 215. For example, the migration manager 165 may determine whether a bandwidth level of the network 215 satisfies a threshold level 280. In some embodiments, the migration manager 165 may receive an indication of the network factors to calculate the network bandwidth level from a network device (e.g., a router) on the network 215 or in other ways. If the bandwidth level does not satisfy the threshold level 280, this may indicate that the network 215 is running slowly. As a result, the amount of data packets that can be queued at the data structure is increased. This may allow the data structure 230 to queue an increasing number of data packets, for example, if it takes an extended amount of time for the notification packet to reach all of the network devices of the network 215.

To determine whether an incoming data packet should be queued, the migration manager 165 may examine each data packet received at the first hypervisor 210-1. For example, if data packet 240 is received by the first hypervisor 210-1, but has the MAC address of the migrated guest set in the destination address field 242, this may indicate that the network has not yet learned of the new location of the guest on the target hypervisor. As such, the packet 240 is queued into buffer 230. In one implementation, the data packet migration manager may receive sometime later an indication that the network has learned the new location of VM 270-1 on the second hypervisor 210-N. For example, the first hypervisor 210-1 may receive another data packet 250 that specifies the MAC address of the VM 270-1 at the source address field 254. This data packet 250 indicates the VM 270-1 is now associated with the new location because the VM 270-1 is currently transmitting data from that new location.

Once the first hypervisor 160-1 determines that the network 215 has learned the new location of VM 270-1, the migration manager 165 forwards all of the data packets in the data structure 230 to a network device (e.g., a NIC) to transmit to the network 215. From there, the network may forward the data packets to the VM 270-1 at the second hypervisor 210-N. After transmission is complete, the first hypervisor 210-1 may free up the portion of memory 201 that is allocated to the data structure 330 for VM 270-1.

Figure 3:
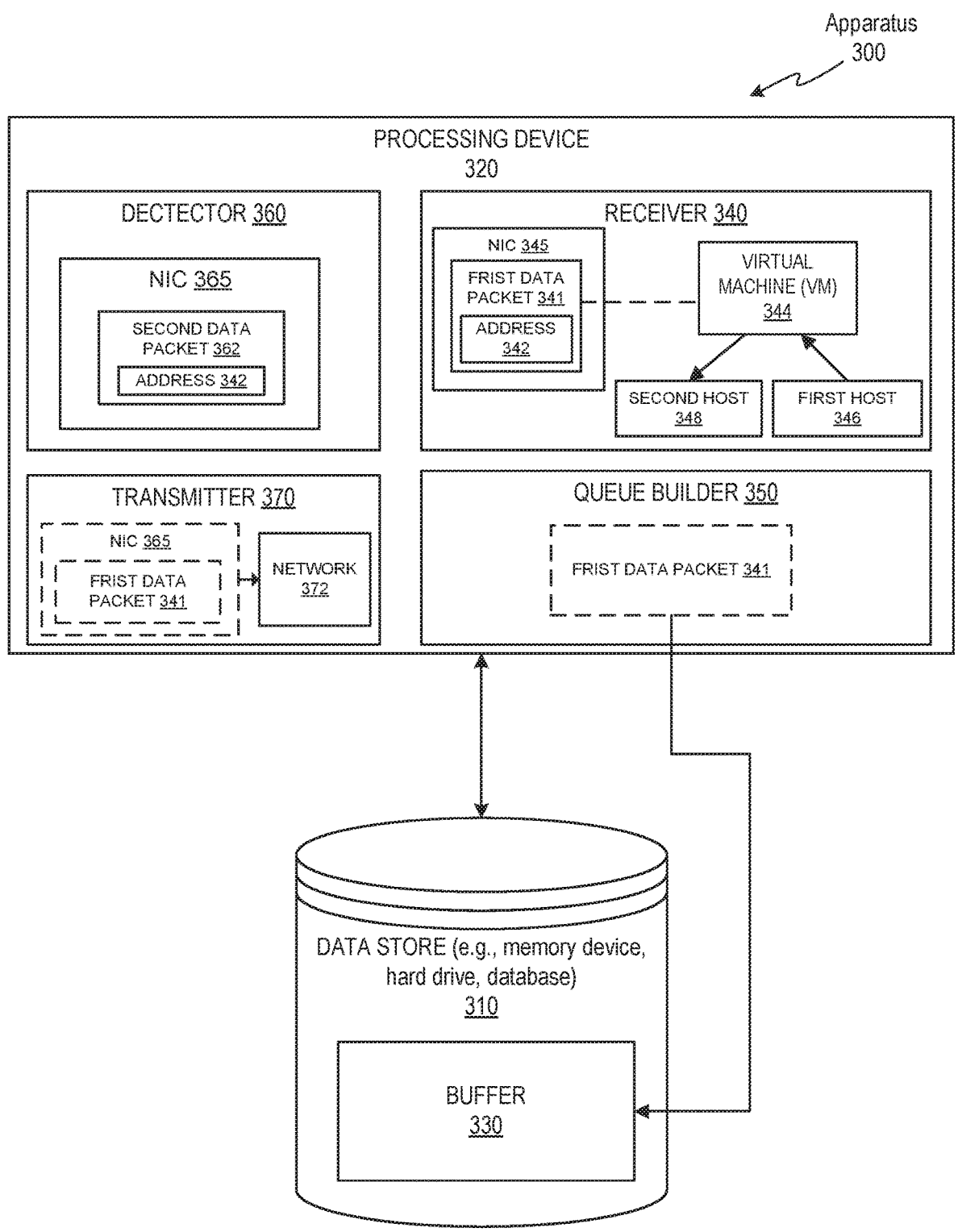
FIG. 3 is a block diagram of an apparatus including a memory directed to packet drop reduction in virtual machine migration according to an implementation of the disclosure.

FIG. 3 is a block diagram of an apparatus 300 including a memory 310 directed to packet drop reduction in virtual machine migration according to an implementation of the disclosure. The apparatus may include the same or similar components to the components within the computer system 100 of FIG. 1. In some implementations, implementations, the apparatus 300 may include processing device 320 (which may be the same or similar to processor 120-1 and 120-N), operatively coupled to memory 310 (which may be the same or similar to memory 130-1 and 130-N), to execute instructions for carrying out the operations as discussed herein.

In some implementations, the apparatus 300 may be operational to provide for packet drop reduction in virtual machine migration by queuing portions of the network traffic directed to a migrated guest for both receiving and transmitting from a source host (e.g., hypervisor) As shown, the apparatus 300 may execute instructions for a receiver 340, an queue builder 350, a detector 360 and a transmitter 370 to transmit the queued network traffic to an address of the guest associated with the target host.

Data store 310 may include any non-persistent data storage (e.g., memory), persistent and/or volatile data storage (e.g., flash storage, hard drive, tape), other medium, or combination thereof that is capable of storing instructions for carrying out the operations of the apparatus 300 discussed herein. In some implementations, the data store 310 may store data for a buffer 330, such as memory data structure. For example, the buffer 330 may be a first-in-first-out (FIFO) buffer. In that regard, apparatus 300 may queue the incoming data packets directed to the migrated guest in the FIFO buffer 330 in the order in which they are received at the source hypervisor. The queued packets in the buffer 300 are then passed immediately to the network device of the source host for transmission when the source receives an indication that the guest is running at the target host.

In operation of the apparatus 300, receiver 340 receives a first data packet 341. The first data packet 341 includes a network address 342 associated with a VM 344 (guest application) that migrates from the first host 346 to a second host 348. For example, the network address 342 may be a physical network address (e.g., MAC address) of the VM 344. In one implementation, the first and second hosts 346, 348 may be hypervisors that each manages a plurality of guest applications, such as VMs. In other implementations, the first and second hosts 346, 348 may be physical machines that host the hypervisors. In either case, the VM 344 can be migrated from the first host 346 to the second host 348 during the operation of apparatus 300. The migration may be a "live migration," which means that the VM 344 can be moved without disruption to the users of the application.

Queue builder 350 queues the first data packet 341 at a memory buffer 330 associated with the first host 346 in view of the network address 342. For example, the queue builder 350 determines whether a first data packet 341 should be queued by examining the packet data fields of the first data packet 341. If the first data packet 341 is received by the first host 346, but has the network address 342 of VM 344 set in the destination address field 242, this may indicate that the network has not yet learned of the new location of VM 344 on the second host 348. As a result, the queue builder 350 buffers the first data packet 341 and any subsequent data packets directed to the migrated VM 344 in the memory buffer 330.

Detector 360 receives an indication (e.g., a second data packet 341) at a NIC 365 that the network address 342 of the guest application is associated with a network device 364 on the second host 348. For example, the indication may include detector 360 detecting that the first host 346 receives a second data packet 362 that has the network address 342 of the VM 344 set in a source address field. This second data packet 362 indicates the VM 344 is now associated with the new location because the VM 344 is currently transmitting data from that new location.

Transmitter 370 causes the NIC 365 to transmit the first data packet 341 to a network 372 associated with the VM 344 at the second host 346. For example, the transmitter 380 forwards all of the data packets queued in the buffer 330 to a network device (e.g., a NIC) that received the second data packet 362. The NIC 365 then transmits the data packets over a network associated with the VM 344 at the second host 346. From there, the data packets may be provided to the VM 344.

Figure 4:
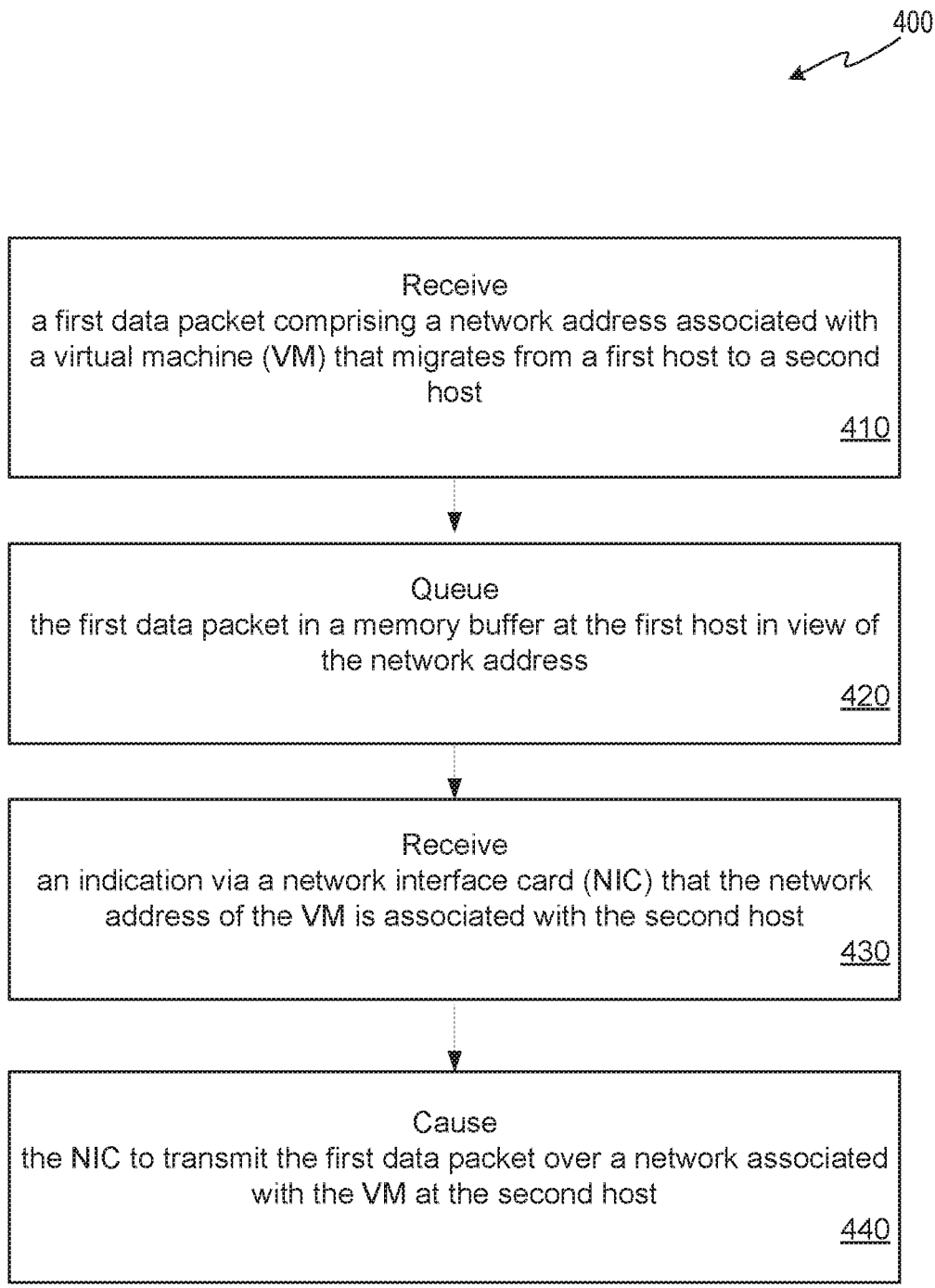
FIG. 4 illustrates a flow diagram of a method of packet drop reduction in virtual machine migration according to an implementation of the disclosure.

FIG. 4 depicts a flow diagram of one implementation of a method 400 in accordance with one or more aspects of the disclosure. In one implementation, the processing device 320 of FIG. 3 may perform method 400 for packet drop reduction in virtual machine migration. The method 400 may be performed by processing logic (e.g., migration manager 165) that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 receives a first data packet 341 that includes a network address 342 associated with a guest application 344 that migrates from a first host 346 to a second host 348. In block 420, information 352 of the first data packet 341 is queued in a memory buffer 330 associated with the first host 346 in view of the network address 342. An indication 362 is received via a network interface card (NIC) 365 that the network address 342 of the guest application 344 is associated with a network device on the second host 348 is received in block 430. In block 440, method 400 causes the NIC 365 to transmit the first data packet 341 of the memory buffer 330 over a network associated with the guest application 344 at the second host 348.

Figure 5:
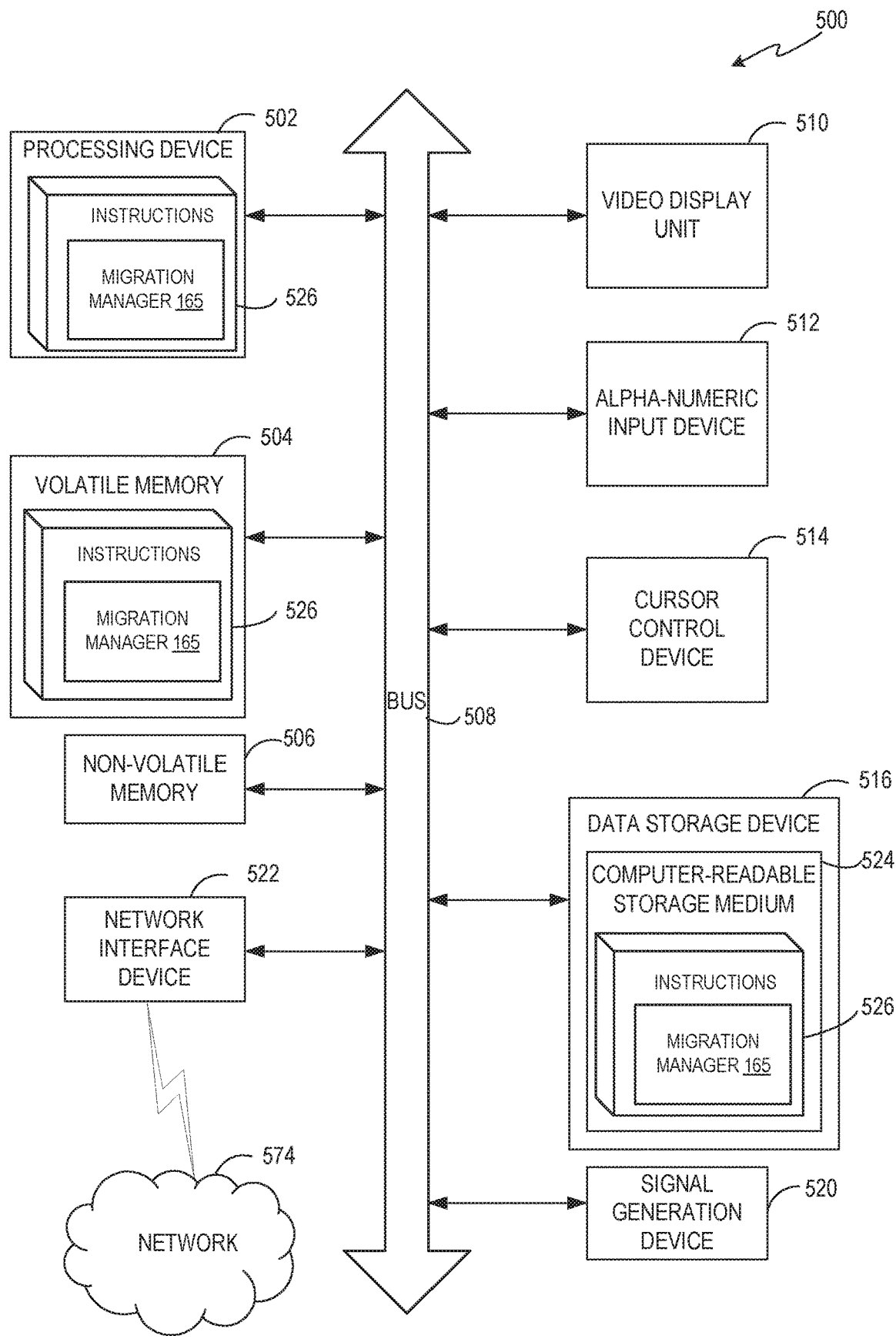
FIG. 5 illustrates a block diagram illustrating a machine in which implementations of the disclosure may be used.

FIG. 5 depicts a block diagram of a machine in the form of a computer system 500 within which a set of instructions, for causing the machine to perform any one or more of the methodologies discussed herein, may be executed. In various illustrative examples, computer system 500 may correspond to a processing device 120-1-n within system 100 of FIG. 1 or the processing device 320 within system 300 of FIG. 3. The machine 500 may be included within a data center that supports virtualization. Virtualization within a data center results in a physical system being virtualized using virtual machines to consolidate the data center infrastructure and increase operational efficiencies.

A virtual machine (VM), such as VMs 170-1 through n of FIG. 1, may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW)

microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the migration manager 165 of FIG. 1 for implementing method 400 of FIG. 4 to packet drop reduction in virtual machine migration.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "intercepting," "updating," "retrieving," "generating," "inspecting," "causing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device, a first data packet directed to a virtual machine (VM) that has migrated from a first host to a second host, wherein the first data packet comprises a first network address of the VM, wherein the first network address of the VM is associated with the first host;
   queuing, by the processing device, the first data packet in a memory buffer at the first host, wherein the memory buffer is to store one or more incoming data packets directed to the VM;
   receiving, by the processing device via a first network interface card (NIC) of the first host, an indication of a second network address of the VM, wherein the second network address of the VM is associated with the second host; and causing the first NIC of the first host to transmit the first data packet from the memory buffer at the first host to a second NIC of the second host, wherein the first data packet is transmitted over a network associated with the VM at the second host.

2. The method of claim 1, further comprising forwarding data packets of the memory buffer to the first NIC.

3. The method of claim 1, the queuing comprises determining that the first data packet specifies the first network address of the VM as a destination address.

4. The method of claim 1, wherein receiving the indication comprises receiving a second data packet specifying the second network address of the VM as a source address.

5. The method of claim 1, wherein the memory buffer comprises a first-in first-out (FIFO) buffer stored in memory of the first host.

6. The method of claim 1, further comprising:
determining whether a bandwidth level of the network satisfies a threshold level; and
adjusting an amount of data packets to queue at a data structure of the memory buffer in view of the determination.

7. The method of claim 6, further comprising:
responsive to detecting that the bandwidth level does not satisfy the threshold level, increasing an amount of space for queuing data packets at the data structure.

8. An apparatus comprising:
a memory to store information for data packets; and
a processing device, operatively coupled to the memory, to:
receive a first data packet directed to a virtual machine (VM) that has migrated from a first host to a second host, wherein the first data packet comprises a first network address of the VM, wherein the first network address of the VM is associated with the first host;
queue the first data packet in a memory buffer, wherein the memory buffer is to store one or more incoming data packets directed to the VM;
receive, via a first network interface card (NIC) of the first host, an indication of a second network address of the VM, wherein the second network address of the VM is associated with the second host; and
cause the first NIC of the first host to transmit the first data packet from the memory buffer at the first host to a second NIC of the second host, wherein the first data packet is transmitted over a network associated with the VM at the second host.

9. The apparatus of claim 8, wherein the processing device is further to forward data packets of the memory buffer to the first NIC.

10. The apparatus of claim 8, wherein to queue, the processing device is further to determine that the first data packet specifies the first network address of the VM as a destination address.

11. The apparatus of claim 8, wherein to receive the indication, the processing device is further to receive a second data packet specifying the second network address of the VM as a source address.

12. The apparatus of claim 8, wherein the memory buffer comprises a first-in first-out (FIFO) buffer stored in memory of the first host.

13. The apparatus of claim 8, wherein the processing device is further to:
determine whether a bandwidth level of the network satisfies a threshold level; and
adjust an amount of data packets to queue at a data structure of the memory buffer in view of the determination.

14. The apparatus of claim 13, wherein the processing device is further to:
responsive to detecting that the bandwidth level does not satisfy the threshold level, increase an amount of space for queuing data packets at the data structure.

15. A non-transitory computer-readable medium comprising instructions that, when executed by a processing device, cause the processing device to:
receive, by the processing device, a first data packet directed to a virtual machine (VM) that has migrated from a first host to a second host, wherein the first data packet comprises a first network address of the VM, wherein the first network address of the VM is associated with the first host;
queue the first data packet in a memory buffer at the first host, wherein the memory buffer is to store one or more incoming data packets directed to the VM;
receive, via a first network interface card (NIC) of the first host, an indication of a second network address of the VM, wherein the second network address of the VM is associated with the second host; and
cause the first NIC of the first host to transmit the first data packet from the memory buffer at the first host to a second NIC of the second host, wherein the first data packet is transmitted over a network associated with the VM at the second host.

16. The non-transitory computer-readable medium of claim 15, wherein the processing device is further to forward data packets of the memory buffer to the first NIC.

17. The non-transitory computer-readable medium of claim 15, wherein to queue, the processing device is further to determine that the first data packet specifies the first network address of the VM as a destination address.

18. The non-transitory computer-readable medium of claim 15, wherein to receive the indication, the processing device is further to receive a second data packet specifying the second network address of the VM as a source address.

19. The non-transitory computer-readable medium of claim 15, wherein the memory buffer comprises a first-in first-out (FIFO) buffer stored in memory of the first host.

20. The non-transitory computer-readable medium of claim 15, wherein the processing device is further to:
determine whether a bandwidth level of the network satisfies a threshold level; and
adjust an amount of data packets to queue at a data structure in view of the determination.

* * * * *